(12) United States Patent
Hashimoto

(10) Patent No.: US 8,077,232 B2
(45) Date of Patent: Dec. 13, 2011

(54) IMAGING DEVICE FOR ADDING SIGNALS INCLUDING SAME COLOR COMPONENT

(75) Inventor: Seiji Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/625,254

(22) Filed: Nov. 24, 2009

(65) Prior Publication Data

US 2010/0066875 A1   Mar. 18, 2010

Related U.S. Application Data

(63) Continuation of application No. 10/936,904, filed on Sep. 9, 2004, now Pat. No. 7,646,413.

(30) Foreign Application Priority Data

Sep. 10, 2003   (JP) ................. 2003-318388

(51) Int. Cl.
  *H04N 5/335* (2011.01)
(52) U.S. Cl. .................. 348/272; 348/229.1; 348/277; 348/294

(58) Field of Classification Search .......... 348/272–275, 348/294, 229.1, 277, 282, 302, 312
See application file for complete search history.

(56) References Cited

U.S. PATENT DOCUMENTS

| | | | | |
|---|---|---|---|---|
| 7,154,542 | B1 * | 12/2006 | Yuki et al. | 348/229.1 |
| 7,209,601 | B2 * | 4/2007 | Manabe | 382/294 |
| 7,349,016 | B2 * | 3/2008 | Fujii et al. | 348/277 |
| 7,372,488 | B2 * | 5/2008 | Kubo | 348/266 |
| 7,573,518 | B2 * | 8/2009 | Nakamura et al. | 348/302 |
| 2001/0010554 | A1 * | 8/2001 | Yoshida | 348/312 |
| 2002/0041332 | A1 * | 4/2002 | Murata et al. | 348/272 |

* cited by examiner

*Primary Examiner* — Tuan Ho
*Assistant Examiner* — Kent Wang
(74) *Attorney, Agent, or Firm* — Canon USA Inc. IP Division

(57) ABSTRACT

An imaging device includes a plurality of photoelectric converting units arrayed in the horizontal and vertical directions, and an adder for adding signals including the same color component from the a plurality of photoelectric converting units such that the centers of gravity of the signals after addition are at the same pitch for respective signals.

3 Claims, 9 Drawing Sheets

| | j | j+1 | j+2 | j+3 | j+4 | j+5 |
|---|---|---|---|---|---|---|
| i | R | G | R | G | R | G |
| i+1 | G | B | G | B | G | B |
| i+2 | R | G | R | G | R | G |
| i+3 | G | B | G | B | G | B |
| i+4 | R | G | R | G | R | G |
| i+5 | G | B | G | B | G | B |

| | n | n+1 | n+2 | n+3 | n+4 | n+5 |
|---|---|---|---|---|---|---|
| m | R | | R | | R | |
| m+1 | | | | | | |
| m+2 | R | | R | | R | |
| m+3 | | | | | | |
| m+4 | R | | R | | R | |
| m+5 | | | | | | |

$$Rij = Rm,n + Rm,n+2 + Rm,n+4$$
$$+ Rm+2,n + Rm+2,n+2 + Rm+2,n+4$$
$$+ Rm+4,n + Rm+4,n+2 + Rm+4,n+4$$

FIG. 1

|     | n | n+1 | n+2 | n+3 | n+4 | n+5 | n+6 | n+7 |
|-----|---|-----|-----|-----|-----|-----|-----|-----|
| m   | R | G | R | G | R | G | R | G |
| m+1 | G | B | G | B | G | B | G | B |
| m+2 | R | G | R | G | R | G | R | G |
| m+3 | G | B | G | B | G | B | G | B |
| m+4 | R | G | R | G | R | G | R | G |
| m+5 | G | B | G | B | G | B | G | B |
| m+6 | R | G | R | G | R | G | R | G |
| m+7 | G | B | G | B | G | B | G | B |

FIG. 2A

|     | j | j+1 | j+2 | j+3 | j+4 | j+5 |
|-----|---|-----|-----|-----|-----|-----|
| i   | R | G   | R   | G   | R   | G   |
| i+1 | G | B   | G   | B   | G   | B   |
| i+2 | R | G   | R   | G   | R   | G   |
| i+3 | G | B   | G   | B   | G   | B   |
| i+4 | R | G   | R   | G   | R   | G   |
| i+5 | G | B   | G   | B   | G   | B   |

FIG. 2B

|     | n | n+1 | n+2 | n+3 | n+4 | n+5 |
|-----|---|-----|-----|-----|-----|-----|
| m   | R |     | R   |     | R   |     |
| m+1 |   |     |     |     |     |     |
| m+2 | R |     | R   |     | R   |     |
| m+3 |   |     |     |     |     |     |
| m+4 | R |     | R   |     | R   |     |
| m+5 |   |     |     |     |     |     |

Rij = Rm,n + Rm,n+2 + Rm,n+4
+ Rm+2,n + Rm+2,n+2 + Rm+2,n+4
+ Rm+4,n + Rm+4,n+2 + Rm+4,n+4

FIG. 2C

|     | n+3 | n+4 | n+5 | n+6 | n+7 |
|-----|-----|-----|-----|-----|-----|
| m   | G   |     | G   |     | G   |
| m+1 |     |     |     |     |     |
| m+2 | G   |     | G   |     | G   |
| m+3 |     |     |     |     |     |
| m+4 | G   |     | G   |     | G   |
| m+5 |     |     |     |     |     |

|     | n | n+1 | n+2 | n+3 | n+4 | n+5 |
|-----|---|-----|-----|-----|-----|-----|
| m+3 | G |     | G   |     | G   |     |
| m+4 |   |     |     |     |     |     |
| m+5 | G |     | G   |     | G   |     |
| m+6 |   |     |     |     |     |     |
| m+7 | G |     | G   |     | G   |     |

|     | n+3 | n+4 | n+5 | n+6 | n+7 |
|-----|-----|-----|-----|-----|-----|
| m+3 | B   |     | B   |     | B   |
| m+4 |     |     |     |     |     |
| m+5 | B   |     | B   |     | B   |
| m+6 |     |     |     |     |     |
| m+7 | B   |     | B   |     | B   |

Bi+1,j+1 = Bm+3,n+3 + Bm+3,n+5 + Bm+3,n+7
+ Bm+5,n+3 + Bm+5,n+5 + Bm+5,n+7
+ Bm+7,n+3 + Bm+7,n+5 + Bm+7,n+7

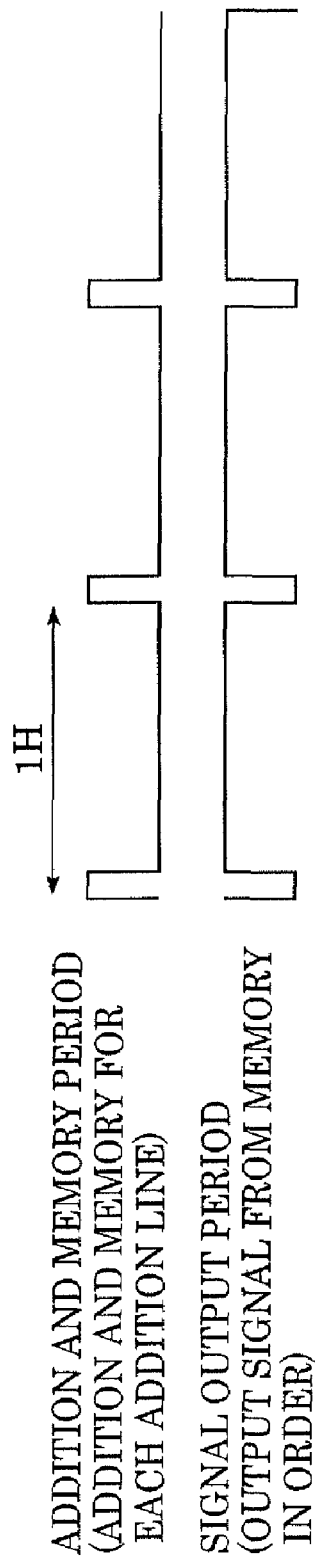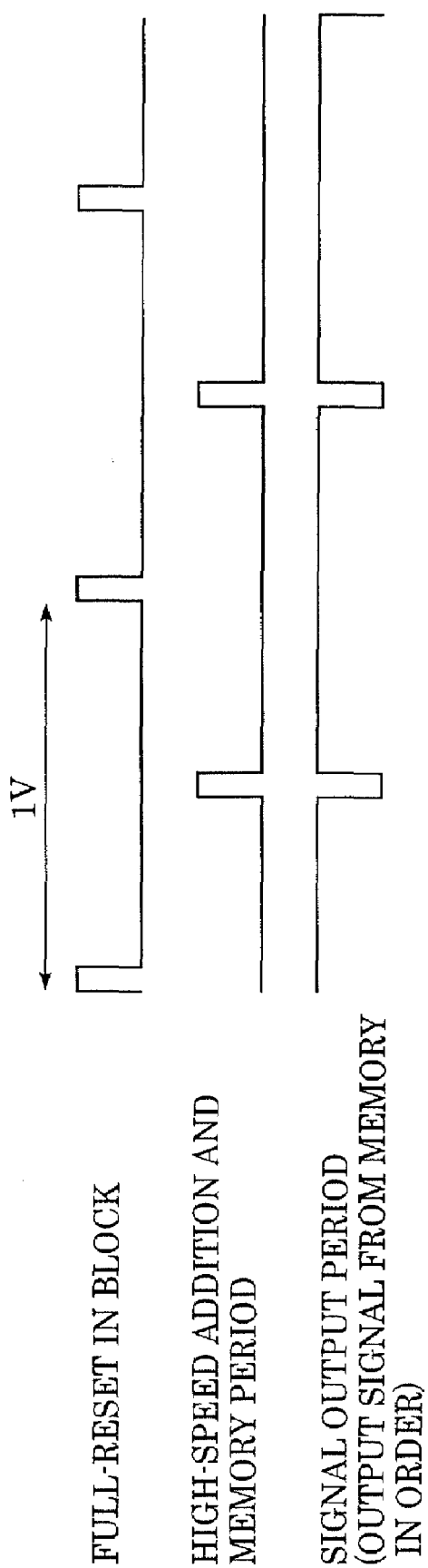

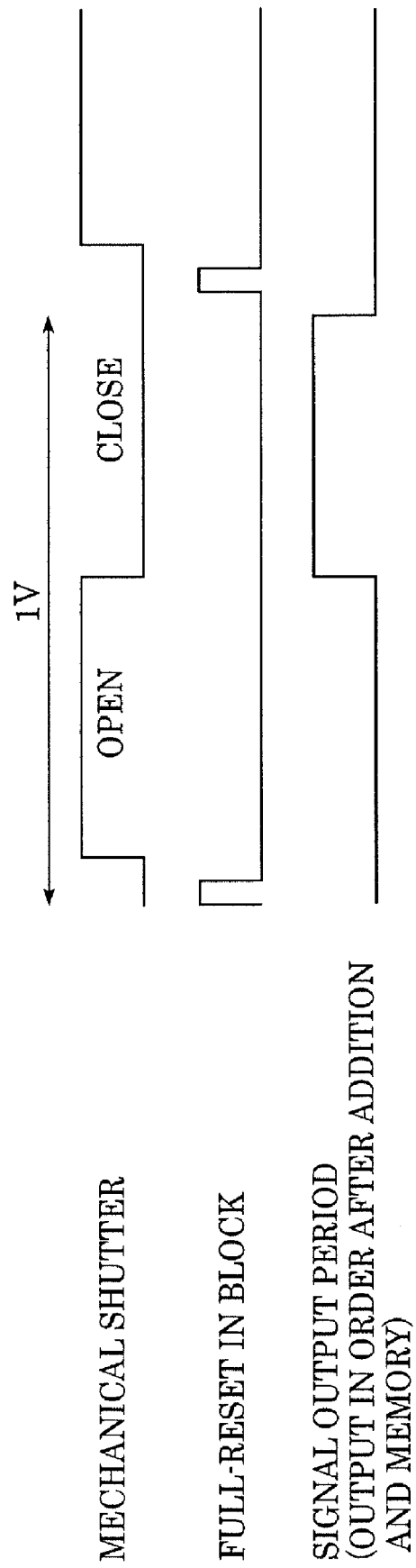

FIG. 8

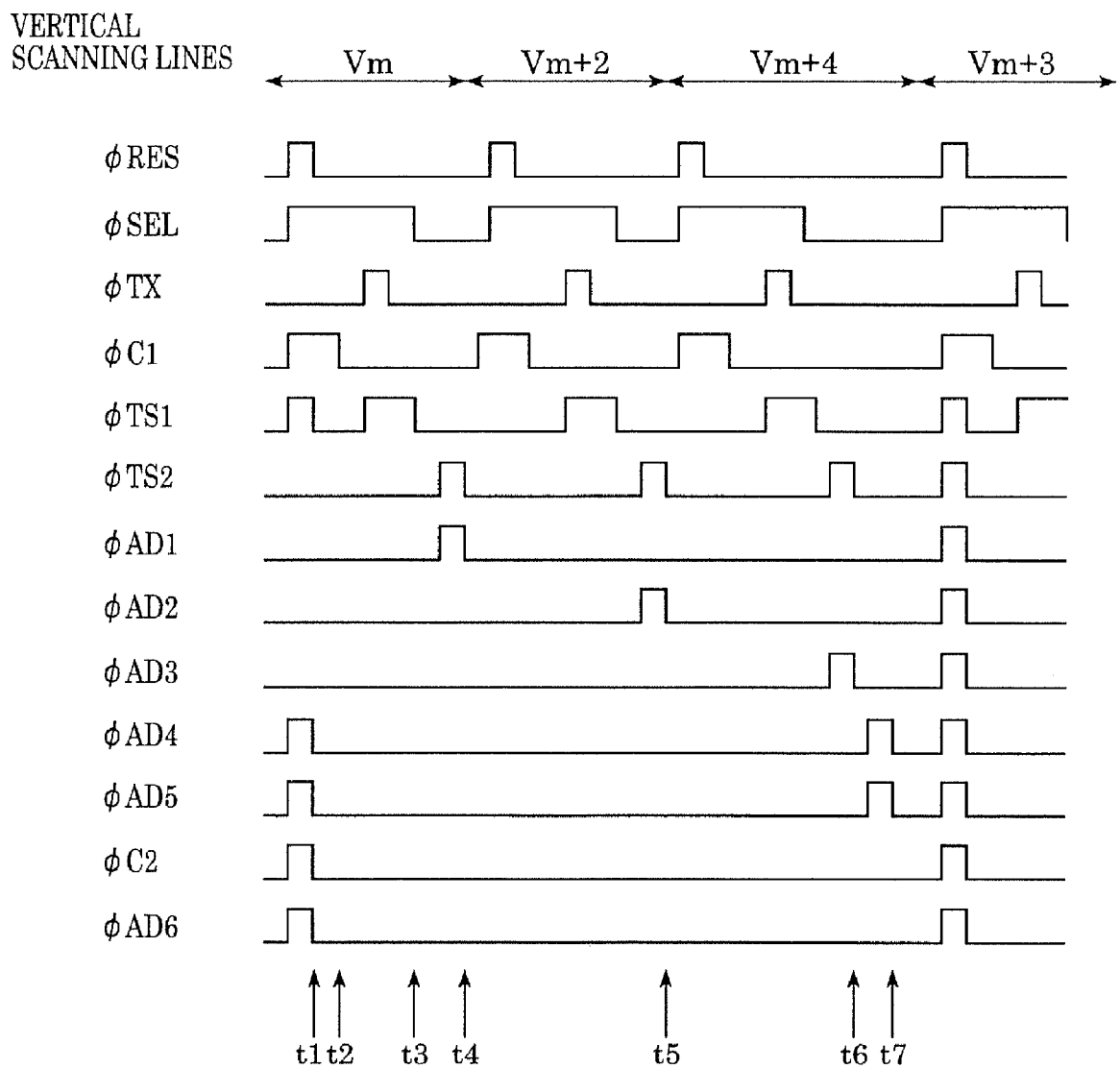

t1  RESET OF PIXEL AMPLIFIER, ADDER UNIT, AND MEMORY
t2  CLAMP OF PIXEL AMPLIFIER NOISE POTENTIAL
t3  END OF TRANSFER OF PHOTOELECTRIC CONVERSION SIGNAL
t4  ADDITION AND MEMORY OF THREE PIXELS WORTH OF LINE m PHOTOELECTRIC CONVERSION SIGNAL
t5  ADDITION AND MEMORY OF THREE PIXELS WORTH OF LINE m+2 PHOTOELECTRIC CONVERSION SIGNAL
t6  ADDITION AND MEMORY OF THREE PIXELS WORTH OF LINE m+4 PHOTOELECTRIC CONVERSION SIGNAL
t7  ADDITION AND MEMORY OF THREE LINES (NINE PIXELS) WORTH OF SIGNALS

IMAGING DEVICE FOR ADDING SIGNALS INCLUDING SAME COLOR COMPONENT

CROSS REFERENCE TO RELATED APPLICATIONS

This application is a continuation of U.S. patent application Ser. No. 10/936,904 filed Sep. 9, 2004, which claims priority from Japanese Patent Application No. 2003-318388 filed Sep. 10, 2003, all of which are hereby incorporated by reference herein in their entirety.

BACKGROUND OF THE INVENTION

1. Field of the Invention

The present invention relates to an imaging device for taking images of a subject.

2. Description of the Related Art

In recent years, imaging elements having up to ten million pixels have been employed for digital still cameras of which primary usage is taking still images, and also imaging elements having several million pixels have been employed for movie cameras of which primary usage is taking moving images. With the above-described usages, in general, taking images has been performed with the high number of pixels in the event of taking high-definition images required for high resolution, and with the low number of pixels in the event of low resolution. In this process, in the event of taking high-definition images, generally all pixel signals have been read out from the imaging elements, and in the event of taking low-resolution images, pixel-signal thinning-out readout and readout for performing both pixel-signal thinning-out and addition, have been performed either to prevent the camera from excessive battery consumption, or to increase the number of shots. Examples of the above-described conventional arrangements include Japanese Patent Laid-Open No. 9-247689 and Japanese Patent Laid-Open No. 2001-36920.

With the arrangement disclosed in Japanese Patent Laid-Open No. 9-247689 (FIG. 3 in the Publication), readout addition is performed by thinning out the same color in increments of 4×4 pixels.

With the arrangement disclosed in Japanese Patent Laid-Open No. 2001-36920 (FIG. 1 in the Publication), a plurality of pixel signals are added, with 4×4 pixels making up one group, such that spatial color array of each color is the same before and after addition.

With Japanese Patent Laid-Open No. 9-247689, the number of valid pixels used in 4×4 pixels is few. Recent imaging elements have reduced unit-pixel size owing to high pixelation, and insufficient sensitivity is becoming a more prominent issue. With digital still cameras, while insufficient sensitivity in shooting of a dark subject can be compensated for with flash emission, taking moving images generates a great amount of noise since an expensive and heavy light source cannot be used. Furthermore, moiré occurs due to deterioration of image sampling frequency owing to pixel-signal thinning-out, resulting in marked deterioration of image quality.

With Japanese Patent Laid-Open No. 9-247689, while sensitivity can be improved by increasing the number of pixel signals to be added within one group, a problem is to provide G pixel signals, which are not used (discarded). Moreover, while a plurality of pixel signals are added within one group such that spatial color array of each color becomes the same before and after addition, a problem is that a small amount of moiré can be observed under magnification.

As described above, with the conventional techniques, there are problems wherein improvement of sensitivity is insufficient due to thinning out of pixel signals, and also, moiré occurs even though the spatial color array is the same.

SUMMARY OF THE INVENTION

It is an object of the present invention to provide good image quality even in the event of obtaining a low-resolution image by adding a plurality of pixel signals.

In order to achieve the above-described object, according to a first aspect of the present invention, an imaging device comprises a plurality of photoelectric converting units arrayed in the vertical and horizontal directions, and adding means for adding the signals including the same color component provided from the plurality of photoelectric converting units such that the centers of gravity of the signals after addition are at the same pitch for respective signals.

This configuration realizes all-pixel readout in the event of taking high-definition images, high sensitivity, high-speed readout, and high quality in the event of taking low-resolution images.

Other objects and features of the present invention will become apparent from the following description of the preferred embodiments with reference to the attached drawings.

BRIEF DESCRIPTION OF THE DRAWINGS

FIG. 1 is a diagram illustrating an example of array of respective colors before adding pixel signals.

FIGS. 2A through 2E are explanatory diagrams illustrating color array after adding pixel signals and signals to be added for each color.

FIG. 5 is an explanatory diagram wherein a signal in increments of a plurality of lines to be added is read out.

FIG. 6 is an explanatory diagram wherein a signal following addition within a screen is read out.

FIG. 7 is an explanatory diagram in a case of employing a mechanical shutter.

FIG. 8 is a timing chart of readout of pixel signals and addition thereof.

DESCRIPTION OF THE EMBODIMENTS

Embodiments of the present invention will now be described in detail in accordance with the accompanying drawings.

FIG. 1 is a diagram illustrating an example of array of respective colors before adding pixel signals, and FIGS. 2A through 2E are diagrams illustrating color array after adding pixel signals and signals to be added for each color.

With an example of color array in FIG. 1, let us say that color filters G (Green), R (Red), and B (Blue) are configured on each photodiode of an imaging element. In this example, G is arrayed in a checkerboard pattern, and R and B are arrayed every other line, in other words, 2×2, i.e., 4 pixels of R, G, G, and B are disposed two-dimensionally as one unit pixel color matrix.

With an addition-readout shooting mode of pixel signals according to the present embodiment of the invention, pixel signals are added within an imaging element so as to configure the same color array as shown in FIG. 2A, the result is stored in memory, and then the result is read out from the imaging element. With the embodiment here, an example of addition of 3×3 i.e., 9 pixels of the same color is shown. FIG. 2B shows addition of Rij signals, i.e., signals on the Rn, Rn+2, and Rn+4 columns corresponding to the m, m+2, and m+4 lines are added. In the same way, FIG. 2C is a diagram illustrating addition of Gi and j+1 signals, FIG. 2D is a diagram illustrating addition of Gi+1, j signals, and FIG. 2E is a diagram illustrating addition of Bi+1 and j+1 signals. In this case, each color is added while overlapping spatially, thus, the center of gravity of spatial sampling is at the same pitch for respective color signals following addition, and further, all of the pixel signals are used. Accordingly, moire on the image due to offset of spatial sampling is removed, and also sensitivity (in particular, optical shot noise) improves by $\sqrt{9}$, i.e., triple the conventional sensitivity. For example, in the event that the present invention is applied to an imaging element having five million pixels, the number of pixels after addition becomes the number of pixels equivalent to around VGA, and accordingly, readout of high-speed shooting with high sensitivity can be realized. Furthermore, in the event that low resolution is necessary, the number of addition pixels may be increased to 5×5 or 7×7. This yields the advantage of increased sensitivity. Even if the number of addition pixels increases, all that is necessary is to increase the memory CA of a later-described adder circuit by the number of lines to be added.

Figure 3:
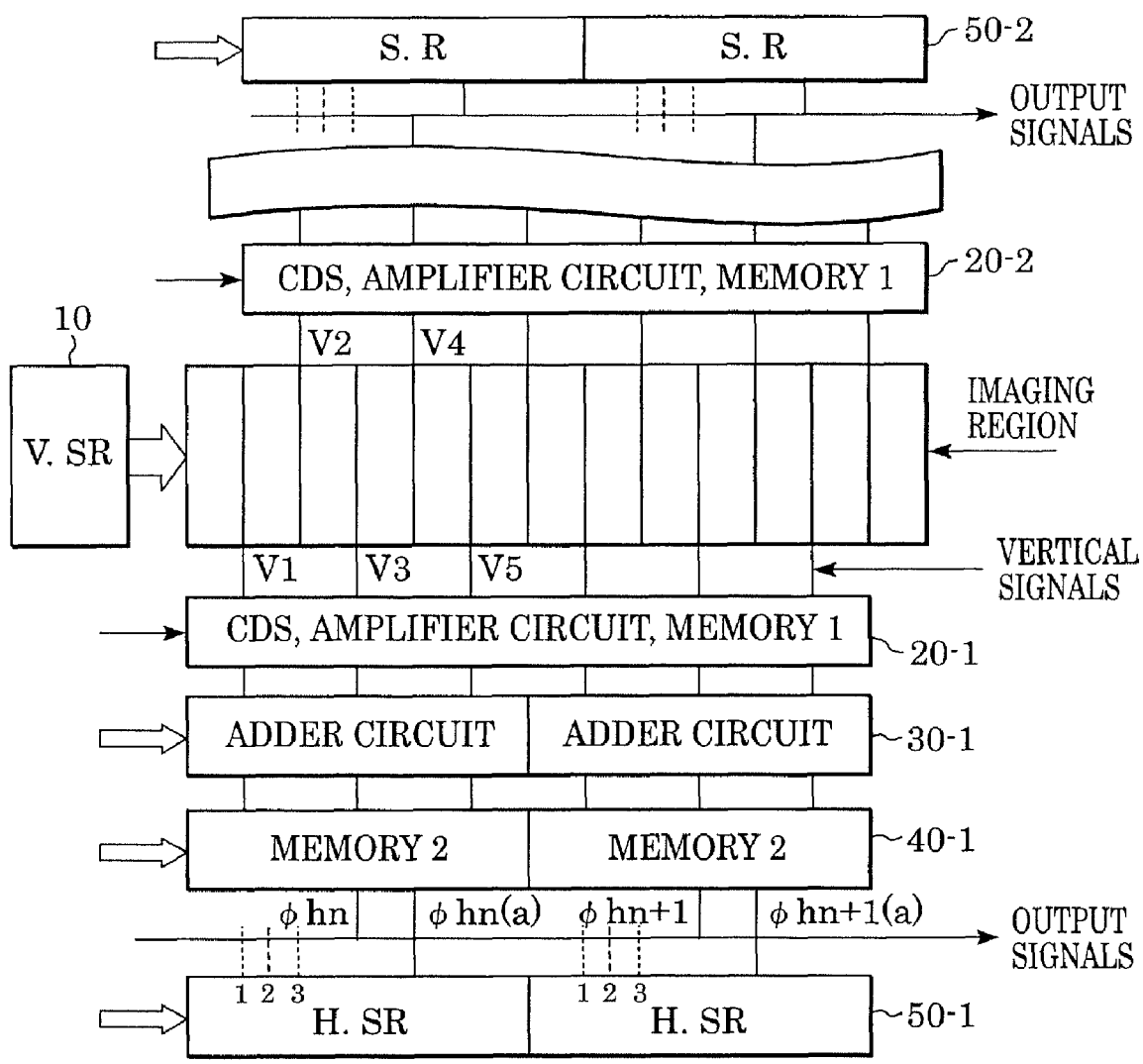
FIG. 3 is a block diagram of an imaging element making up an imaging device.
Figure 10:
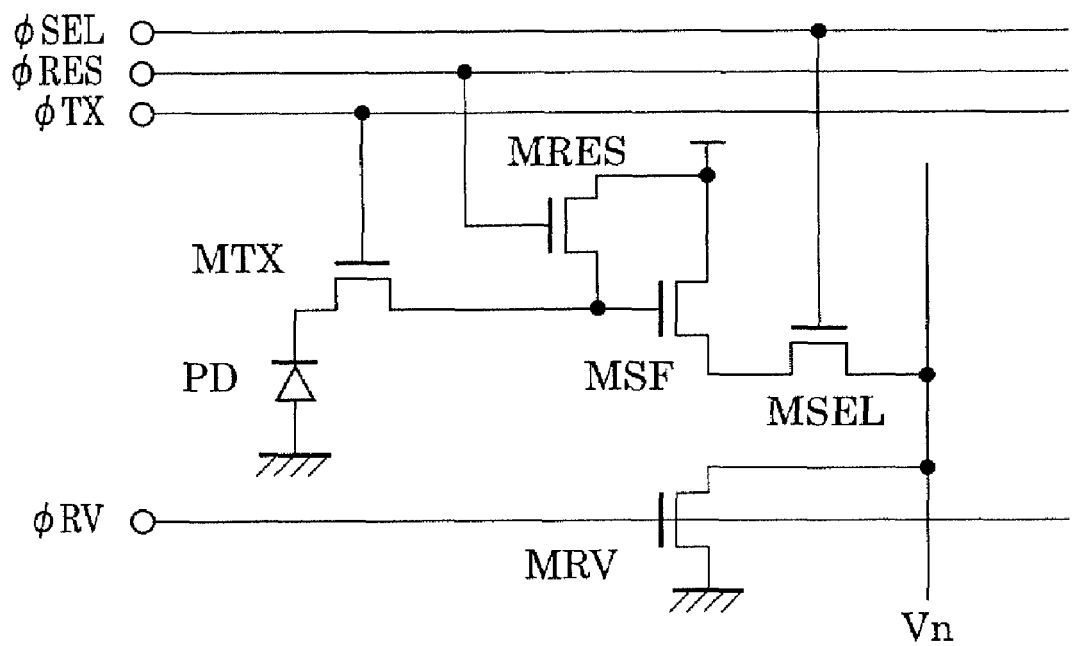
FIG. 10 is a unit pixel circuit diagram of a pixel unit.

Next, description will be made regarding an example of the internal configuration of an imaging element. FIG. 3 is a block diagram of an imaging element of an imaging device according to the present embodiment of the invention. In the drawing, a pixel unit made up of a photodiode for performing photoelectric conversion such as shown in FIG. 10 described later, a pixel amplifier, and the like, are disposed and connected to an imaging region, in matrix fashion. The pixel unit of this imaging region is controlled by a plurality of driving pulses from a vertical scanning circuit (V. SR) 10. The odd numbered vertical signal lines of the imaging region are connected to a CDS/amplifier-circuit/memory-circuit 20-1, the even numbered vertical signal lines are connected to a CDS/amplifier-circuit/memory-circuit 20-2. The circuit blocks above and below the imaging region have the same configuration in the drawing, so hereinafter, description will be made regarding only the circuit block below the imaging region. With the signal from the pixel unit, noise of the pixel unit is removed at the CDS/amplifier-circuit/memory-circuit 20-1, and only the signal components are amplified and stored to the memory 1. In the event that the present imaging device operates in the all-pixel readout mode rather than in the addition-readout mode, the signals in the memory 1 are controlled by scanning pulses φhn (1), φhn (2), and φhn (3) from horizontal scanning circuits (H. SR), and are read out to an output signal line. In the event of the addition-readout mode, the signals in the memory 1 are led to adder circuits 30-1. At the adder circuits 30-1, the signals having the same color from the memory 1 are added. The signals subjected to addition are temporarily accumulated in memory 2, and are controlled by the scanning pulse φhn (a) from the horizontal scanning circuits (H. SR), and then are read out to the output signal line.

Figure 4:
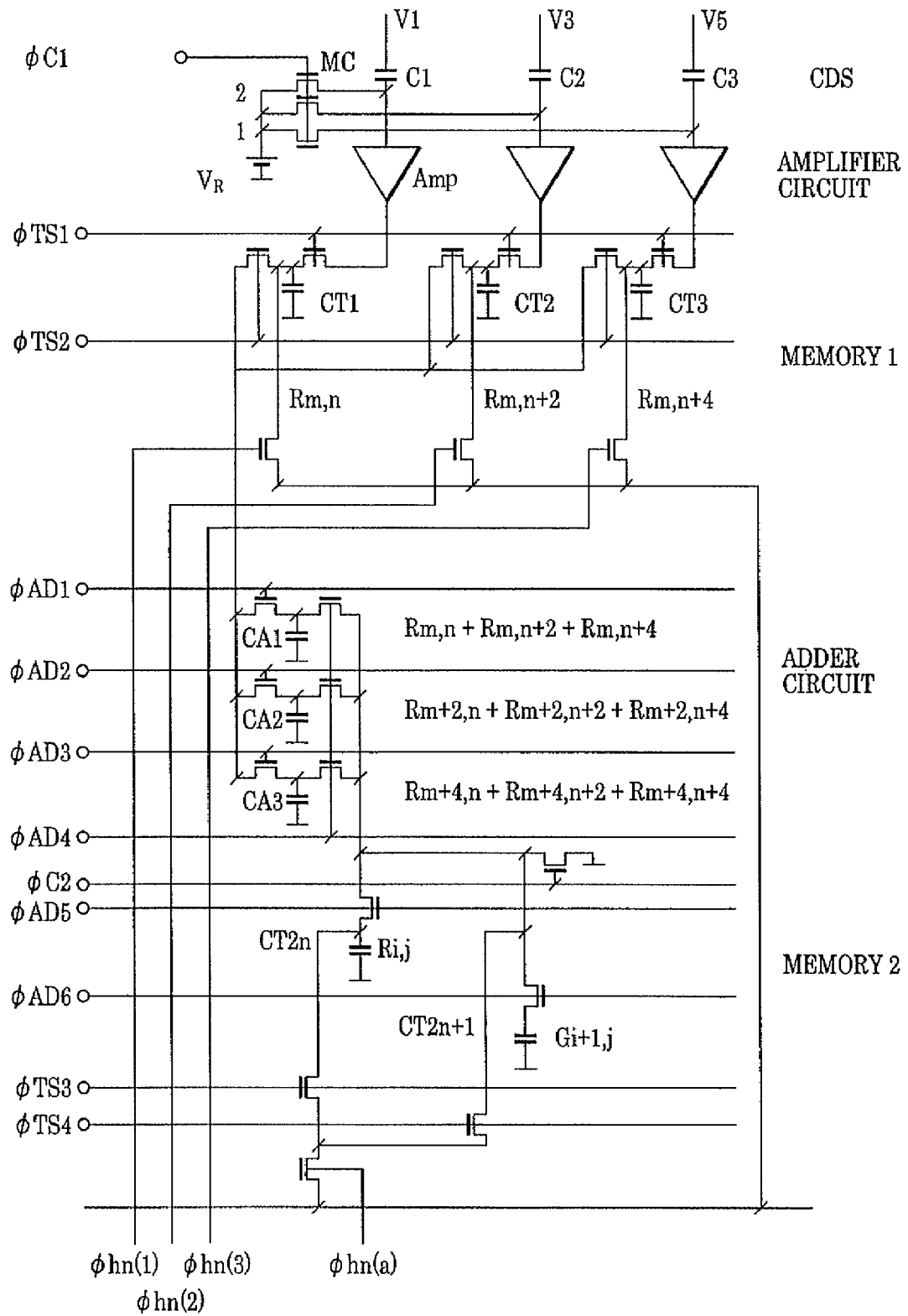
FIG. 4 is a partial circuit diagram of a signal processing circuit of pixel signals read out from an imaging region.

FIG. 10 illustrates a unit pixel circuit diagram of the pixel unit, FIG. 4 is a partial circuit diagram of a readout signal processing circuit of pixel signals from the imaging region, and FIG. 8 illustrates a timing chart of addition of pixel signals. While description will be made regarding readout from the pixel unit and addition of signals with reference to these drawings, the arrangement in FIG. 4 illustrates an example of addition of 3×3 pixels within the imaging block diagram in FIG. 3.

The pixel unit in FIG. 10 is made up of a photodiode PD serving as a photoelectric converting unit, a transfer switch MTX for controlling transfer of signal charge from the photodiode PD, a pixel amplifier MSF connected to the transfer switch MTX, a reset switch MRES for resetting the residual charge of a gate portion (floating diffusion) of the pixel amplifier MSF, and a selection switch MSEL for controlling transfer of signals from the pixel amplifier. A current source switch MRV of the pixel amplifier is provided on the outside of the imaging region.

Description will be made regarding the readout signal processing circuit in FIG. 4. A circuit made up of a capacitance C, a clamp switch MC, a reference voltage source VR, and an amplifier Amp is a CDS circuit for removing noise from the pixel unit. Circuits for temporarily accumulating signals of 3 columns subjected to CDS are memory capacitances CT1, CT2, and CT3 of the memory 1 circuit. A circuit for adding and temporarily accumulating three signals of the memory 1 circuit is a memory capacitance CA1. In the same way, circuits for temporarily accumulating different signals to be added on the horizontal pixel lines are memory capacitances CA2 and CA3. A circuit for adding and temporarily accumulating the signals from these memory capacitances CA1, CA2, and CA3 is a capacitance CT2 of the memory 2 circuits.

Next, description will be made with reference to the timing chart in FIG. 8. Upon an arbitrary exposure period elapsing, first, each residual charge at the node of each circuit unit is reset under control of each pulse. At time t1, the gate portion of the pixel amplifier MSF is reset with a pulse φRES, the memory 1 circuit by pulses φC1 and φS1, the adder unit capacitances CA1, CA2, and CA3 by pulses φAD4, φC2, and φAD5, respectively. At time t2, pixel amplifier noise is clamped by the clamp capacitance C when the pulse φC1 is off, and the charge of the photodiode is input to the clamp capacitance C by a pulse φTX via the pixel amplifier.

Consequently, the pixel noise is removed by CDS, and temporarily accumulated in the memory 1 circuit via the amplifier Amp. Now, let us say that vertical scan is performed on the row m in FIG. 1, the signals from the vertical signal lines V1, V3, and V5, i.e., signals Rm and n are temporarily accumulated in the memory capacitance CT1, the signal Rm and a signal n+2 are accumulated in the memory capacitance CT2, and the signal Rm and a signal n+4 are accumulated in the memory capacitance CT3 respectively.

At time t3, the transfer of the photoelectric conversion signal of the row m pixel is completed with a pulse φSEL and the pulse φTS1 turning off. At time t4, a signal from the memory 1 circuit is added to the adder memory capacitance CA1 with pulses φTS2 and φAD1.

In the same scan and operation, the row m+2 pixel signal is added and temporarily accumulated in the memory capacitance CA2 at time t5, and the row m+4 pixel signal is added and temporarily accumulated in the memory capacitance CA3 at time t6. At time t7, the signals of the memory capacitances CA1, CA2, and CA3 are added in a memory capacitance CT2n with the pulses φAD4 and φAD5. Consequently, nine pixels worth of an R signal is added in the memory capacitance CT2n, thereby obtaining signals Ri and j to be added.

In the same operation, nine pixels worth of a G signal is added in the memory capacitance CT2n+1, thereby obtaining signals Gi+1 and j to be added. While this embodiment provides two pixels worth of memory capacitances in the vertical direction, the memory 2 circuit may be equivalent to the number of addition pixels, for example, the number equivalent to VGA. This depends on the concept of the imaging system. An arrangement may be made wherein the pixel signals of the whole screen are transferred at high speed, and are added and temporarily accumulated in the memory 2 circuit in arbitrary increments, and then the pixel signals are read out sequentially. As shown in FIG. 4, the present embodiment handles both the all-pixel readout mode and the addition-readout mode with the memory 1 circuit. In particular, addition is performed with the memory 1 circuit regardless of addition of a great number of a plurality of pixels of 3×3 i.e., 9 pixels, thereby reducing memory in size. This is effective in reducing the imaging element in size.

With the above-described nine-pixel addition-readout mode, improvement of sensitivity is tripled (as to optical shot noise), and accordingly the system performs amount-of-exposure control, and sets the amount of incident light to around one third. This means that the photoelectric conversion signal at each photodiode is reduced to one third. In the event that the imaging element is a CCD, even if the amount of incident light is one third, the signal charge is tripled following addition by adding nine pixel charge. Accordingly, if nothing is done, saturation of signals becomes a problem. One setback is that sensitivity and saturation properties are mutually counteractive issues.

With a CMOS sensor according to the present embodiment, addition of average values of signal voltage is employed, and accordingly in the event that deterioration of the signal level due to capacitance division is ignored, the signal level is around one third after addition of nine pixel signals. This means that saturation of the signals is enhanced threefold the previous saturation. However, a small signal level means that the noise of the output amplifier connected to the horizontal output line (omitted in FIG. 4) is of major concern. Accordingly, the present invention sets the amplifier gain of the amplifier circuit following CDS at the addition-readout mode to around triple that of the all-pixel readout mode. Consequently, the noise of the output amplifier can be reduced, thereby achieving improvement of sensitivity owing to addition of pixel signals, high-speed readout by reducing the number of pixels to be read out, maintenance of a high dynamic range, and low consumption of electricity.

Description will be made regarding arrangements of a method for reading out signals at the addition-readout mode with reference to FIGS. 5, 6, and 7.

FIG. 5 is an example of readout of signals in increments of a plurality of lines to be added. In this example, a signal is read out from a pixel in increments of lines to be added, and is added to the signals in the memory, following which the signal is output externally from the memory during one horizontal scan. In FIG. 6, all pixels of the imaging region are reset in block, following exposure, and following addition of all pixel signals on the whole screen in arbitrary increments, addition pixels equivalent to VGA are temporarily accumulated in the plurality of memory 2 circuits, and then the signal is output from the memory 2 circuits sequentially. FIG. 7 illustrates a case of employing a mechanical shutter wherein all the pixels of the imaging region are reset in block, following exposure with the mechanical shutter, and following addition of pixel signals in arbitrary increments, the pixel signals are output externally from the memory 2 circuit during one horizontal scan.

Figure 11:
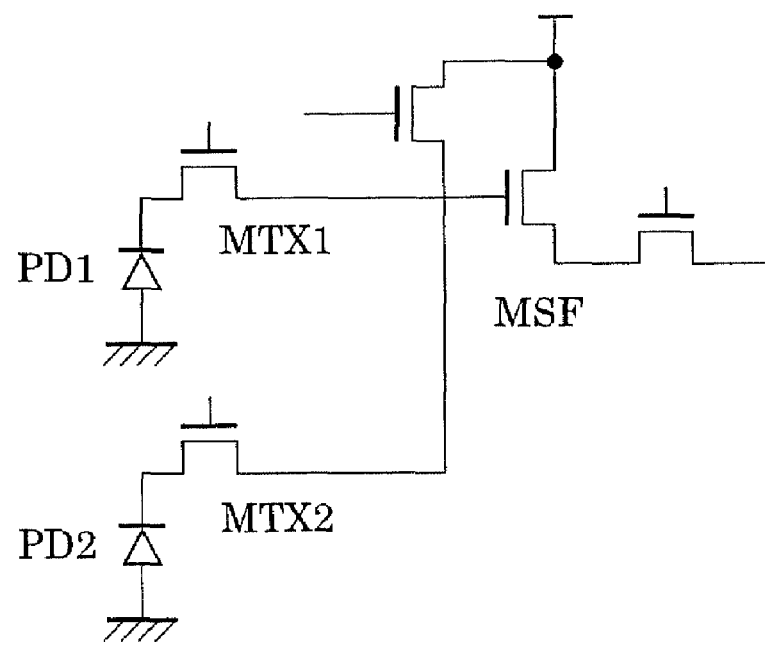
FIG. 11 is an example of a pixel configuration diagram of a common amplifier pixel.

As for the pixel unit of the imaging region, while description has been made regarding a configuration wherein one pixel amplifier corresponds to one photodiode in FIG. 10, another configuration example of the pixel unit is shown in FIG. 11, which is a common amplifier configuration. This is an example of the configuration wherein two photodiodes correspond to one pixel amplifier. In the event that a plurality of photodiodes are disposed as to one amplifier, the area of the pixel amplifier as to one photodiode is reduced, resulting in an advantage wherein the opening percentage of the photodiode improves.

Figure 9:
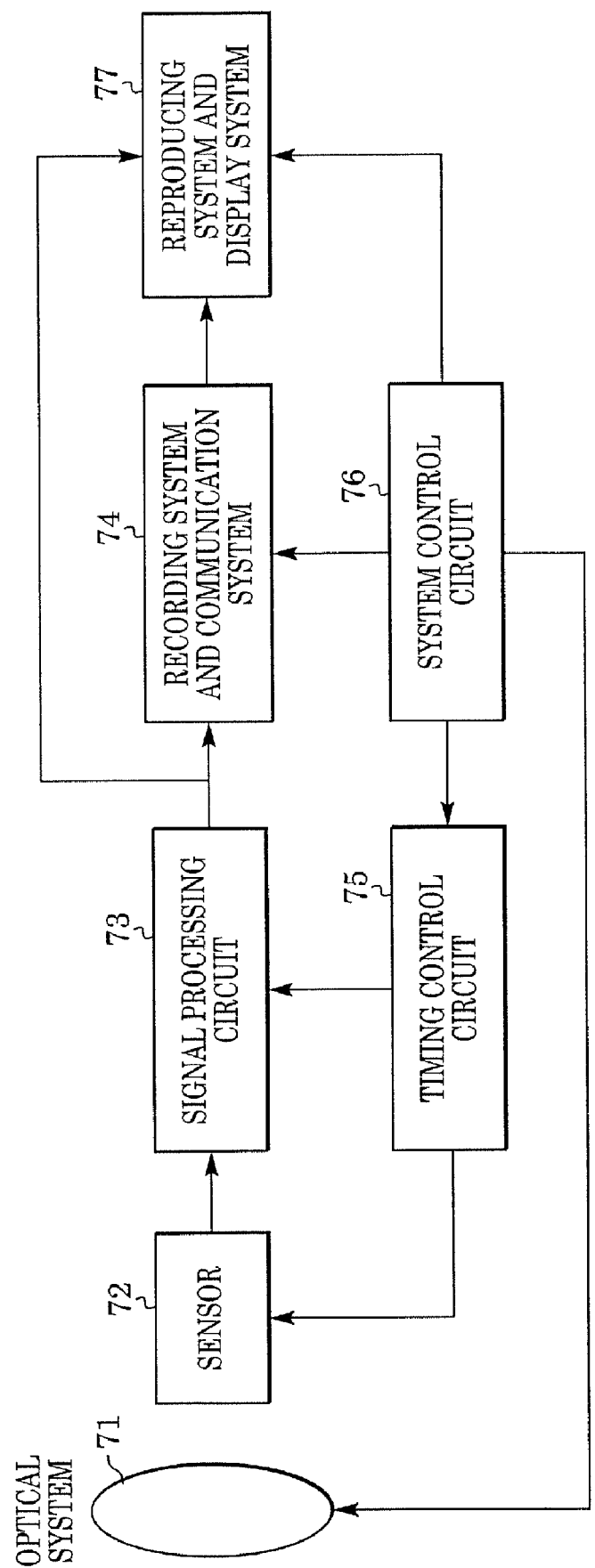
FIG. 9 is a system diagram.

FIG. 9 illustrates a schematic diagram of the system with the above-described imaging element. As shown in the drawing, a subject light entering through an optical system 71 forms an image on a sensor 72. The light information is converted into electric signals by pixels disposed on the sensor. The electric signals are subjected to signal conversion processing with a predetermined method determined by a signal processing circuit 73 beforehand. The signals subjected to the signal processing are recorded or transmitted with a recording-system/communicating-system 74, and with an information-recording device. The signals recorded or transferred are reproduced or displayed with a reproducing-system/display-system 77. The sensor 72 and the signal processing circuit 73 are controlled by a timing control circuit 75, and the timing control circuit 75, the recording-system/communicating-system 74, and the reproducing-system/display-system 77, are controlled by a system control circuit 76. The timing control circuit 75 selects the all-pixel readout mode or the addition-readout mode.

Horizontal and vertical driving pulses are different between the all-pixel readout mode and the addition-readout mode. Accordingly, there is the need to change the driving timing of the sensor, resolution processing of the signal processing circuit, the number of recording pixels of the recording system for each readout mode. The above-described control is performed by the system control circuit depending on each readout mode. Sensitivity due to addition differs depending on the readout mode. With regard to this difference in sensitivity, the system control circuit controls the diaphragm (not shown), and the timing control circuit switches the gain of the amplifier circuit Amp of the sensor so as to be increased with a control pulse from the timing control circuit, thereby obtaining an appropriate signal.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging device comprising:
a plurality of pixels arrayed in the horizontal and vertical directions, each of the plurality of pixels having a photoelectric converting unit and a pixel amplification unit outputting a signal based on an electrical charge accumulated in the photoelectric converting unit;
a noise removing unit removing noise generated in the pixel; and
a plurality of color filters arranged in a Bayer pattern,
wherein the pixel array has a plurality of regions each comprising adjacent pixels of five rows by five columns, and a center pixel of one region comprising the pixels of five rows by five columns is adjacent to a center pixel of another region comprising the pixels of five rows by five columns with being two pixels spaced apart from the center pixel of the another region in directions of the rows and the columns, and wherein the imaging device has an addition mode in which signals from plural pixels in a first, third, and fifth rows and a first, third, and fifth columns in each of the regions comprising the pixels of five rows by five columns are added.

2. The imaging device according to claim 1, further comprising a plurality of column amplification units provided corresponding to the plurality of pixel columns.

3. The imaging device according to claim 1, wherein the imaging device is operable in a mode in which the signals from the plurality of pixels are added and in a mode in which the signals from the plurality of pixels are not added, and wherein gain of the column amplification unit in the mode in which the signals are added is higher than the gain of the column amplification unit in the mode in which the signals from the plurality of pixels are not added.

* * * * *